(12) United States Patent
Sulkowski et al.

(10) Patent No.: US 8,126,805 B2
(45) Date of Patent: Feb. 28, 2012

(54) SYSTEM AND METHOD FOR REVOLVING CREDIT PRODUCT OFFER CUSTOMIZATION

(75) Inventors: Nikolas Sulkowski, New Canaan, CT (US); Leonard Laufer, Scarsdale, NY (US)

(73) Assignee: Argus Information and Advisory Services, LLC, White Plains, NY (US)

( * ) Notice: Subject to any disclaimer, the term of this patent is extended or adjusted under 35 U.S.C. 154(b) by 1070 days.

(21) Appl. No.: 10/398,613

(22) PCT Filed: Oct. 5, 2001

(86) PCT No.: PCT/US01/31471
§ 371 (c)(1),
(2), (4) Date: Aug. 25, 2003

(87) PCT Pub. No.: WO02/29691
PCT Pub. Date: Apr. 11, 2002

(65) Prior Publication Data
US 2005/0102221 A1    May 12, 2005

Related U.S. Application Data

(60) Provisional application No. 60/238,500, filed on Oct. 6, 2000.

(51) Int. Cl.
*G06Q 40/00* (2006.01)
(52) U.S. Cl. ........................................................ 705/39
(58) Field of Classification Search .............. 705/39–42; 235/379–381; 902/1–4
See application file for complete search history.

(56) References Cited

U.S. PATENT DOCUMENTS

| 5,870,721 | A | * | 2/1999 | Norris ............................. 705/38 |
| 5,878,403 | A | * | 3/1999 | DeFrancesco et al. ......... 705/38 |
| 6,014,645 | A | * | 1/2000 | Cunningham .................. 705/38 |
| 6,158,657 | A | * | 12/2000 | Hall et al. ...................... 235/380 |

* cited by examiner

*Primary Examiner* — Olabode Akintola
(74) *Attorney, Agent, or Firm* — Greenberg Traurig, LLP

(57) ABSTRACT

A system and method are disclosed for making an offer for at least one revolving credit product to an applicant. An identifier for each of a plurality of revolving credit products is stored and at least one attribute (145) is associated with each of the revolving credit products. An application for a revolving credit product is received from an applicant (105). One or more of the revolving credit product issuer's (160) objectives are identified. A set of revolving credit products that fit within an applicant profile is created, ranked, and at least one of the top ranking revolving credit products are then offered to the applicant from the set of revolving credit products.

20 Claims, 9 Drawing Sheets

SYSTEM AND METHOD FOR REVOLVING CREDIT PRODUCT OFFER CUSTOMIZATION

RELATED APPLICATIONS

This application claims priority under 35 U.S.C. §119(e) from U.S. Provisional Application No. 60/238,500 of Sulkowski et al. filed Oct. 6, 2000 which is herein incorporated by reference in its entirety.

FIELD OF THE INVENTION

The present invention relates to a revolving credit product issuer system for customization of revolving credit products and complementary service offers in response to customer and prospective customer needs, credit risks, and anticipated behavior. One revolving credit product may be, for example, a credit card with a single set of terms. Another revolving credit product may be, for example a line of credit. In still other embodiments, the revolving credit product may be any combination of revolving credit products.

BACKGROUND OF THE INVENTION

In existing revolving credit product issuing businesses, issuers may send prospective customers offers through, for example, the mail. While revolving credit product issuers attempt to customize their offers and services to a customers' needs based upon known characteristics of a potential mailing group, such solicitations can not be customized to each individual. Moreover, current revolving credit product systems do not provide the flexibility to permit customer interaction in the process.

In addition, existing computer systems used for maintaining existing customer revolving credit product accounts generally permit the credit limit of customers with good credit history to be increased, and of those with risky credit history to be decreased. These systems, however, cannot automatically respond to customer's needs or learn their anticipated behavior.

There is a need to make more personalized offers for revolving credit product and complementary services to prospective and current customers.

SUMMARY OF THE INVENTION

It is an object of the present invention to provide a revolving credit product issuer with a method and apparatus for interacting with current and prospective customers, and thereby to provide targeted offers to such current and/or prospective customers.

It is a further object of the present invention to provide a revolving credit product issuer with a method and apparatus for managing a revolving credit product account portfolio that is determined based upon the issuers internal objectives.

It is yet another object of the present invention to provide a system and method for delivering targeted revolving credit product offers over the Internet.

It is another object of the present invention to integrate external data and data provided by potential consumers to identify and electronically deliver credit product offerings for the potential consumer.

It is yet a further object of the present invention to provide alternative, more suitable offerings to potential consumers that have rejected one or more previous credit product offerings.

To meet the need of providing a revolving credit product issuer with the ability to make more personalized offers for revolving credit products and complementary services to prospective and current customers, the inventive system positions a revolving credit product issuer so that it can provide customized offers to both existing revolving credit product customers and to prospective customers. The system evaluates relevant experience for revolving credit product users, directly aligns the issuer's strategic and marketing objectives with the users' experience, and learns quickly from web-based marketing experiences.

The objective of the present invention may be accomplished through several modules. In one embodiment of the invention, the modules are incorporated into the revolving credit product issuer's Internet platform. Together, these modules can enable the customization of offers that issuers provide to an applicant. In one embodiment of the invention, the modules comprise an: (1) Initial Input Module; (2) Applicant Characterization Module; (3) Product Offers Module; (4) Complementary Product Offers Module; (5) Offer Refinement Module; (6) Performance Tracking Module and (7) Learning Module. These seven modules can customize the experiences for: (1) applicant's who currently do not have a revolving credit product with the issuer and are seeking a revolving credit product, (2) applicants who have a credit product with the issuer and are seeking another or a replacement revolving credit product, or (3) applicants who have a revolving credit product with the issuer and are seeking some modification to their revolving credit product.

In one embodiment, the present invention comprises: an initial input module that selects and presents questions to an applicant and solicits responses from said applicant; an applicant characterization module that characterizes applicants based on the responses to questions presented by the initial input module; a product offers module that determines and presents an ideal product offer to the applicant based on the applicant's characterization and on the relative importance of the issuer's objectives, a complementarty product offers module that determines and presents an appropriate complementary product offer to the applicant based on the applicant's characterization and on the relative importance of the issuer's objectives; an offer refinement module that, for applicants who have rejected offers presented by either the product offers module or the complementary product offers module, identifies alternative offers acceptable to the issuer that more closely align with the applicant's needs than the rejected offers; a performance tracking module that generates reports summarizing applicant behavior and the issuer's profitability and sales performance, based on questions presented to a plurality of applicants, responses to those questions, product offers presented to the plurality of applicants, and rejections and acceptances of those product offers; and a learning module that evaluates applicants' responses and behavior associated with accepted and rejected product offers to improve future targeting offers to applicants.

One embodiment of the present invention enables issuers to characterize internal objectives, focusing on the relative and absolute importance of account growth, asset growth, risk management and profit management. The present invention also enables issuers to integrate and leverage external data, such as credit bureau data, demographic data, etc., and visit generated data, such as answers to questions, URLs, cookies, etc., to profile each applicant in terms of product attributes they value, credit risk, anticipated behavior and current behavior (if current customer).

Another embodiment of the present invention further enables issuers to identify the best credit product offers and complementary offers to make to each individual applicant in the context of the issuer's objectives. The invention enables issuers to identify what attributes the applicant can change to refine the offer and refine and learn as experience and data are gained. The invention can meet issuer's goals while responding to the applicant's needs, credit risk, and anticipated behavior.

The present invention is compatible with front-end and web-site management capabilities. The invention relies on a cross issuer database of customer behavior, risk and profitability. Such data are compiled longitudinally and are supplemented with extensive primary market research. The invention relies on the segmentations and account level valuation methods. The invention utilizes experience with behavior and profitability modeling at the individual customer level.

A preferred embodiment of the method of the invention includes several steps. First, an identifier for each of a plurality of revolving credit products is stored. At least one attribute is associated with each of the revolving credit products.

An application is then received from the applicant. The application is profiled based on certain characteristics to provide an applicant profile. In one embodiment of the invention, the applicant profile may include: (1) the value he/she ascribes to revolving credit products and complementary features; (2) credit risk; (3) anticipated credit product behavior; and (4) current behavior with the issuer's credit products (if he/she is a current credit product customer).

The issuer's objectives of an offer are identified. In one embodiment of the invention, the revolving credit issuer defines the relative importance of its various business objectives. These objectives may include account generation, asset generation, specific goals for risk management and profit management.

A set of revolving credit products is created. The set may comprise a plurality of revolving credit products that fit within the applicant's profile. The revolving credit products in the set of revolving credit products are then ranked based upon the objective of the offer, and the attributes of the revolving credit products.

An offer is made to the applicant of at least one of the top ranking revolving credit products from the set of revolving credit products.

Should an offer be rejected by an applicant, the revolving credit product issuer may make counter-offers to the applicant, and the applicant may evaluate alternatives to the initial offer set. This option is crafted so that the applicant can highlight credit product features he or she wants to adjust so that credit product alternatives more closely aligned to the applicant's needs can be identified. These alternatives are offered only if the revolving credit product issuer is still able to meet its business objectives.

In addition, the invention incorporates applicants' feedback and learns over time, improving targeted offers to applicants by focusing on response rate, risk, behavior and profitability.

DETAILED DESCRIPTION OF THE INVENTION

The present invention, an application system, relates to a system and method for making a customized offer for revolving credit products to an applicant in response to the issuer's objectives for the offer and the applicant's needs, credit risks, and anticipated behavior.

The term revolving credit product, as used herein is used in the broadest sense of its ordinary meaning, namely, to refers to credit products that permit ongoing debits and credits to an account. Examples of revolving credit products include credit cards and credit lines.

In one embodiment of the invention, an applicant may be offered a choice between the one or more revolving credit products such as credit cards, each credit card having its own unique set of attributes, including credit terms. In another embodiment of the invention, the applicant may be offered a choice between one or more revolving credit products such as various credit lines with differing attributes. In still a further embodiment of the invention, the applicant may be offered a choice of revolving credit product involving a combination of revolving credit products, and thus, include one or more credit cards, credit lines or other revolving credit products.

The present invention may be implemented in a computer program that executes on a revolving credit product issuer's computer system, and is accessible to applicants via a computer network such as the Internet.

Figure 1:
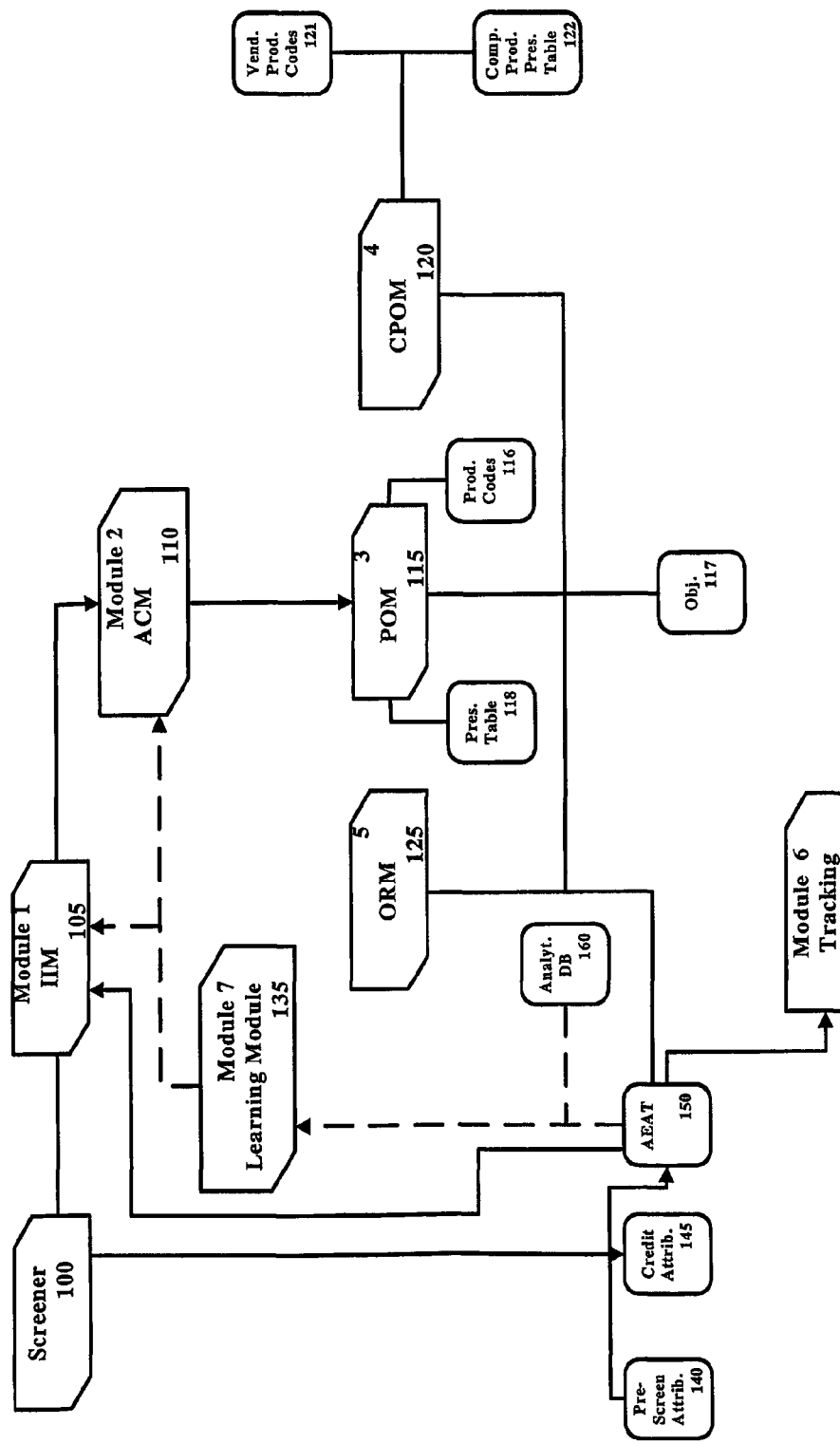
FIG. 1 depicts a general overview of the modules and databases according to one embodiment of the present invention.

An overview of the system components according to one embodiment of the present invention is shown in FIG. 1. In the embodiment of the invention illustrated, seven modules are incorporated into a revolving credit product issuer's network platform to enable the customization of offers to individual prospective and/or active customers. As described above, in one embodiment of the invention, the network platform is the Internet. The modules are operatively connected to each other, and to several databases and/or system components as shown in FIG. 1 and described herein.

The first system component an applicant to the issuer's site encounters is a screener 100. Screener 100 may be a hardware or software component that possesses "front end" or initial screening questions to the applicant in an attempt to determine the applicant's demographic information, and reason for entering the issuer's site. The screener may also attempt to ascertain whether the applicant is a prospective, current, or former customer of the issuer.

Once the initial screening questions are answered, the applicant is passed over to Initial Input Module ("IIM") 105 i.e. Module 1. The purpose of IIM 105 is to clarify the characteristics of each applicant, and enables credit risk evaluation for those "thin-file" applicants that would not otherwise qualify for credit based on available credit bureau files. IIM 105 accomplishes this task by delivering meaningful questions that build on each other in order to clarify the characteristics of each applicant. (e.g., Are you a full-time student? If so, what is the name and address of your university or college? Are you employed? If so, what is the name and address of your company?).

Once the initial questions in IIM 105 are completed the applicant is transferred to an applicant Characterization Module ("ACM") 110, i.e. Module 2. ACM 110 characterizes the applicant based on external data and applicant responses to the questions presented in IIM 105. ACM 110 then assigns the applicant to a pool that reflects their characteristics. In one embodiment of the invention the applicants are characterized according to four objectives: risk assessment; behavior pattern; value assessment; and likelihood of acceptance.

In one embodiment of the invention, the risk assessment is in the form of a FICO score (Fair Isaacs and Company Credit Risk Score). The FICO score may be obtained from a standard credit report.

The behavior pattern represents the behavior, and anticipated behavior of an applicant with regard to revolving credit products. In one embodiment of the invention, the behavior pattern is described as a numerical score and presented in the form of a vector. Some behavior patterns that factor into the behavior pattern score include: the applicant's needs and requests regarding the revolving credit product; the applicant's past transactions regarding revolving credit product, and the potential profitability to the revolving credit product issuer based on the applicant's transaction history; etc.

A third objective that may be used to describe or characterize an applicant is a value assessment. In one embodiment of the invention, discrete choice questions are posed to the applicant (e.g., Do you prefer a credit card with an APR of 9.9% and no annual fee to a credit card with an APR of 7.9% and an annual fee of $75?), and the responses evaluated. The value assessment then assigns a value assessment tag to the applicant based on the applicant's responses.

In one embodiment of the invention, the value assessment tag represents a score for the applicant relative to a segment or group of other applicants. These segments or groups may represent a category or classification of other applicants with known similar characteristics. Some categories that may comprise the applicant groups include descriptions of the applicant's needs and requests, and include: frequent flyer; low fees but higher monthly interest rates; desires rewards points; etc.

Another objective that may be used to describe or characterize the applicant is the likelihood of acceptance. In one embodiment of the invention, the likelihood of acceptance can be predicted using the attributes of the revolving credit product and the applicant's values or value assessment (using conjoint analysis or discrete choice utility functions, for example).

The ACM 110 is operatively connected to an applicant experience and attribute tracking database ("AEAT") 150. AEAT 150 contains the external data used by ACM 110 in conjunction with the applicant responses to questions presented in IIM 105 to characterize the applicant. In one embodiment of the invention, AEAT 150 contains information relating to offered and accepted products. This information may be periodically invoked by Tracking Module 130 to generate a tracking report. In addition, information stored in the Applicant Experience and Attribute Tracking Database AEAT 150 may be passed to the Learning Module 135.

The applicant's pool assigned in ACM 110 is then passed to: Product Offers Module ("POM") 115, i.e. Module 3; Complementary Product Offers Module ("CPOM") 120, i.e. Module 4; and Offer Refinement Module ("ORM") 125; i.e. Module 5.

POM 115 evaluates the revolving credit products, based on a set of attributes. Preferably, available revolving credit products are each evaluated. The attributes on which the revolving credit products evaluation is based may include, for example, the APR, interest rate, promotional APR, credit line, annual fees, reward points, color of a credit card, brand of a credit card, grace period for delinquent repayment, repayment terms and fix/variable interest rate. Once the attributes are determined, POM 115 identifies the most appropriate product offers for each applicant based on each individual applicant's characteristics, as identified by the ACM 110, and the product attributes. This allows each applicant to be offered a relevant and unique experience.

In one embodiment of the invention, POM 115 obtains product codes (i.e., numerical values describing each unique product offering) for the products from a table of product codes 116, and matches them with the issuer's objectives for the product, the objectives are stored in an objectives table 117. The issuer's objectives may include objective priorities such as account growth, asset growth, risk and profit. The product codes that meet the issuer's objectives are then matched with specific descriptions and graphic presentation material from product presentation table 118 to enhance the applicant's sales experience.

CPOM 120 may evaluate complementary products available to the applicant and identifies the most appropriate complementary product offers for each applicant based on each individual applicant's characteristics as identified by the ACM 110. Similar to Module 3 described above, CPOM 120 obtains complementary product codes for the complementary products from a table of vendor complementary product codes 121, and matches them with the issuer's objectives stored in an objectives table 117. The complementary product codes that meet the issuer's objectives can be matched with specific descriptions and graphic presentation material from a complementary product presentation table 122 to enhance the applicant's sales experience.

In a preferred embodiment ORM 125 performs two functions. First, ORM 125 may be used in connection with an existing customer seeking a modification to the issuer's credit card. In that case, ORM 125 identifies alternative refinements that are acceptable to the issuer, and that may more closely align with the customer's needs. Secondly, ORM 125 may be used in connection with applicants that are seeking a new revolving credit product, and who have rejected the offers presented in POM 115. In the latter case, ORM 125 allows the issuer to make several product counter-offers that are equally acceptable to the issuer, and that may more closely align with the applicant's needs. In one embodiment of the invention, ORM 125 obtains refined product and complementary product codes for the products from tables of product codes 116 and vendor complementary product codes 121, and matches them with the issuer's objectives stored in an objectives table 117. The refined product codes and complementary product codes that meet the issuer's objectives are then matched with specific descriptions and graphic presentation material from tables 118 and 122 to enhance the applicant's sales experience.

Modules IIM 105, POM 115, CPOM 120 and ORM 125 are all operatively connected to the Tracking Module 130, i.e. Module 6, through the applicant experience and attribute tracking database AEAT 150. Tracking Module 130 is also operatively connected to the issuer's analytic database 160, where individual customer's behavior and current product types and attributes are saved. Tracking module 130 reports the results of the applicant's experience and product attributes from these modules in a consistent and reliable manner. To maintain consistency, Tracking Module 130 contains a reporting engine and a set of report templates to facilitate the production and distribution of the tracking report. The report templates may summarize various results, including, for example, customer behavior, account profitability, sales performance etc.

Learning Module 135 leverages the experience of applicants and customers, as characterized by the applicants experience and attribute tracking database AEAT 150 and issuer's analytic database 160, to learn in one or more distinct domains. In one embodiment of the invention, the Learning Module 135 learns how to align offers and counter offers to applicants and customer. In another embodiment of the invention, the Learning Module 135 learns how to aggregate applicants in more homogeneous and relevant groups to anticipate performance. In yet another embodiment of the invention, the Learning Module 135 learns how to assess credit risk among thin-file applicants. In still a further embodiment of the invention, the Learning Module 135 learns in a combination of the domains.

In practice, the Learning Module 135 reads the applicant experience and attribute tracking database AEAT 150 and the issuer's analytic database 160. In particular, the Learning Module reads the customer's behavior information, as well as the applicant's responses to questions posed in modules IIM 105, POM 115, CPOM 120 and ORM 125. This data is then used to enhance the alignment of offers to applicants and credit risk evaluation among thin-file applicants. Learning will be reintegrated into modules IIM 105, ACM 110, POM 115, CPOM 120 and ORM 125.

Figure 2:
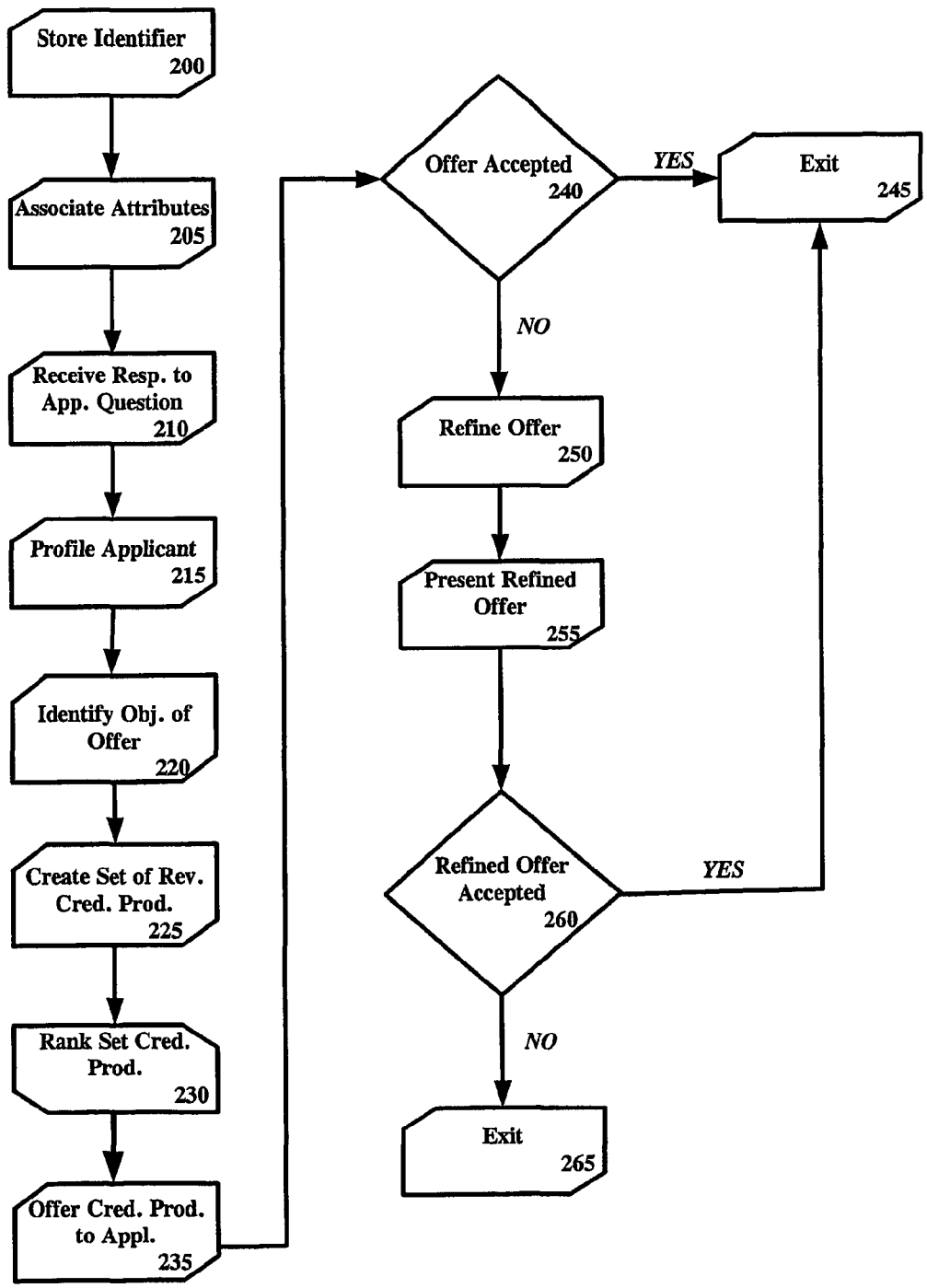
FIG. 2 depicts a flow chart describing a general overview of the method according to one embodiment of the present invention.

An overview of the method according to one embodiment of the present invention is shown in FIG. 2. In step 200, an identifier for each of a plurality of revolving credit products is stored. Each identifier can be used to uniquely identify a revolving credit product. At least one attribute is associated with each of the revolving credit products as shown in step 205. As described earlier, these attributes may include, for example, the APR, interest rate, promotional APR, credit line, annual fees, reward points, color of a credit card, brand of a credit card, grace period for delinquent repayment, repayment terms, fix/variable interest rate, etc. In one embodiment of the invention, the identifiers and attributes are stored in a table of product codes.

An application for a revolving credit product is received from an applicant as shown in step 210. In one embodiment of the invention, an applicant accesses the revolving credit product issuer's web site, and the applicant is presented with some initial screening questions. As previously described, the initial questions may be used to determine whether the applicant is a prospective or current customer and if a current customer, whether the applicant is interested in modifying the attributes of an existing revolving credit product account, or is interested in acquiring a new or alternative revolving credit product account. Once these initial questions have been answered, the system passes the URL and applicant's needs gleaned from the questions to the IIM 105. If the applicant is also a current customer, the system also provides information relating to the customer to the initial input module (IIM 105). The IIM 105 presents a selection of questions to the applicant designed to build on each other in order to clarify the characteristics of each applicant.

At step 215 the application is profiled to provide an application profile. In one embodiment of the invention, as described above, the applicant is characterized according to four objectives: risk assessment; behavior pattern; value assessment; and likelihood of acceptance. The four objectives used to describe the applicant are used to assign the applicant to a pool of applicants with similar characteristics.

In one embodiment of the invention, the results of the questions presented to the applicant by the IIM 105 are then passed to the Applicant Characterization Module ACM 110. The ACM 110 uses the results, along with data extracted from the Applicant Experience and Attribute Tracking Database AEAT 150 to assign the applicant to the appropriate and relevant pool. The applicant's assigned pool is then passed to the Product Offers Module POM 115, the Complementary Product Offers Module CPOM 120, and the Offer Refinement Module OFM 125.

One or more of the revolving credit product issuer's objectives of the offer are identified in step 220. In one embodiment of the invention, this involves determining the relative importance of key objectives of the issuer, for example, account growth, asset growth, risk and profit. From these key objectives, the issuer's objectives of the offer may be determined by using models that estimate the outcome of offering each product to each group of customers for each objective (i.e., account generation, asset generation, profit generation, credit losses, etc.). The relative importance of the issuer's objectives is passed to POM 115, CPOM 120 and OFM 125 from the issuer's objectives table 117.

In step 225, a set of revolving credit products (i.e. revolving credit products and complementary products) that fit within the applicant's profile is created. As described above, the revolving credit products are described using the product codes or product attributes. In one embodiment of the invention, the product is described using a plurality of attributes stored in a table of product attributes.

The revolving credit products and complementary products are then ranked based upon the issuer's objective of the offer, and the at least one attribute of the revolving credit products as shown in step 230. In one embodiment of the invention, the revolving credit products and complementary credit products are evaluated and prioritized by the products offers module POM 115 and complementary product offers module CPOM 120 respectively. As described earlier, in one embodiment of the invention, POM 115 receives a list of the product codes for the products to offer each applicant from the data table of product codes 116. The product codes are matched and prioritized with the issuer's objectives stored in objectives table 117. Similarly, CPOM 120 receives a list of the complementary products codes for the complementary products to offer each applicant from data table of complementary product codes 121. In one embodiment of the invention, the complementary product codes are matched and prioritized with the issuer's objectives stored in objectives table 117, the pool information from ACM 110, and information passed from the Learning Module 135 to determine the product offers to be presented to the applicant. Once matched these product and complimentary products are offered to the applicant as shown in step 235.

A determination is then made as to the applicant's acceptance of the product and/or complementary product offer in steps 240. If an applicant accepts an offer, the system exits at step 245 so that the offer can be processed. If, on the other hand, the offer is rejected, the offer is refined as shown in step 250. The offer is then offered to the applicant as shown in step 255.

A determination is then made in step 260 as to the applicant's acceptance or rejection of the refined offer. If the applicant accepts the refined product and complementary product offer, the system exits at step 245 so that the offer can be processed. Alternatively, if the applicant rejects the refined offer, the system exits at step 265.

In one embodiment of the invention, the Offer Refinement Module ORM 125 is invoked to refine the offer.

Figure 3:
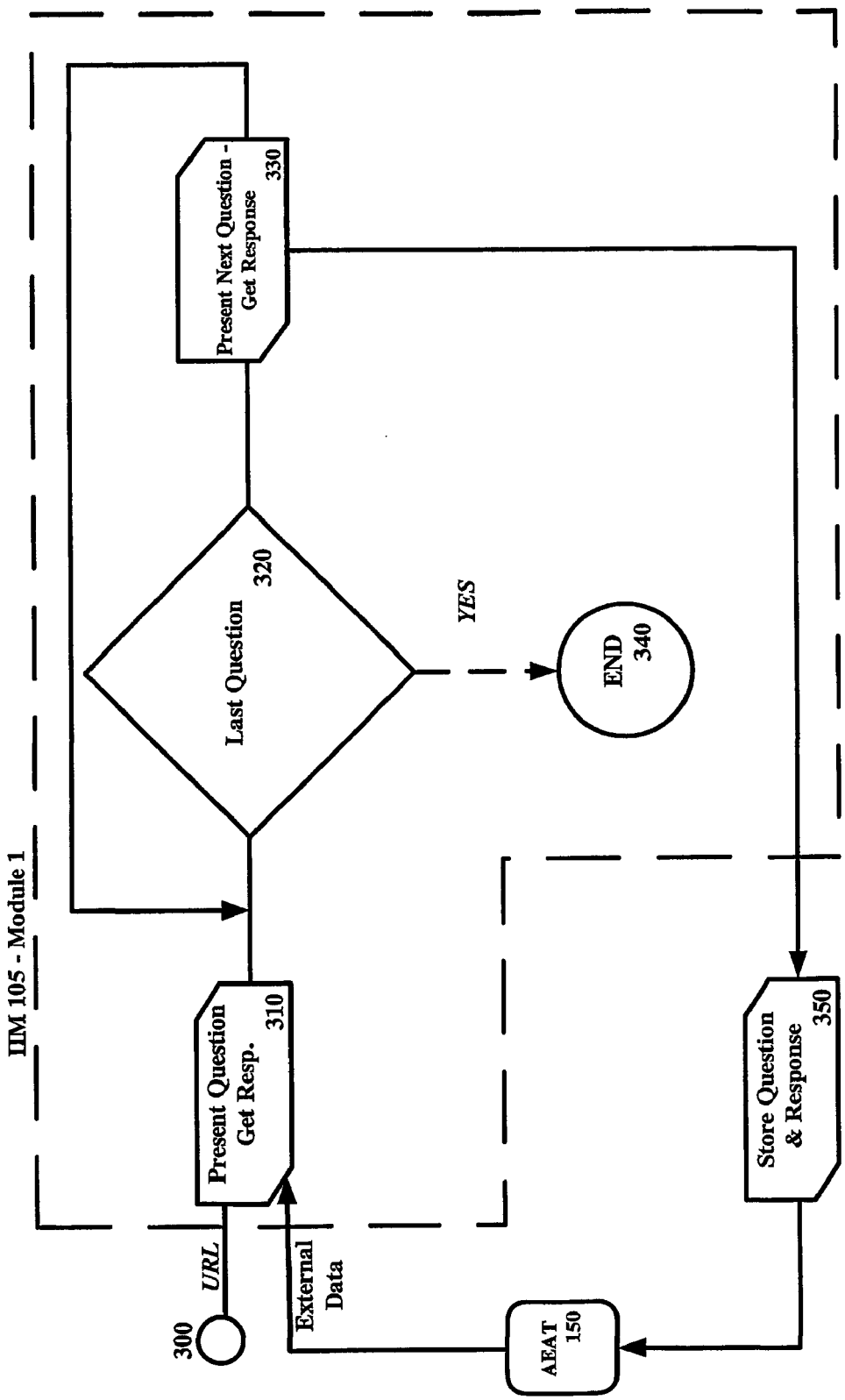
FIG. 3 depicts a flowchart of the steps comprising the Initial Product Module according to one embodiment of the present invention.

FIG. 3 is a flow chart depicting the steps taken to determine the characteristics of each applicant in the Initial Input Module IIM 105 (Module 1) according to one embodiment of the present invention. Based on the applicant's characteristics and the referring URL, module IIM 105 has a series of questions to present to the applicant. As described earlier, these questions are designed to build on each other. In one embodiment of the invention, the questions are selected so that based on the responses to previous questions, further questions are presented to the applicant. As applicants progress through the question trees, the applicant's credit needs and values may be determined. In addition, for thin-file applicants, IIM 105 enables revolving credit product evaluation for those applicants who would not otherwise qualify for credit based on available credit bureau files.

The applicant enters the module at step 300, and the referring URL along with external data is passed to IIM 105. In one embodiment of the invention, the external data may comprise the applicant's unique ID, previous experience of applicants, and attribute data from AEAT 150. An initial question is presented at step 310. This question is selected based on information passed from the front-end questions in step 210, along with information extracted from the Applicant Experience and Attribute Tracking Database AEAT 150. A determination is made in step 320 as to whether the question presented to the applicant is the last question in the queue. If the answer to this query is in the negative, follow-up questions are selected and presented to the applicant at step 330. In one embodiment of the invention, these follow-up questions are based, at least in part, on the applicant's responses to the previous questions. If the determination at step 320 is in the affirmative, the last question is reached, at which point the module exits at step 340. The responses (and other available data) provide the basis for profiling each applicant. Thus, as applicants progress through the question tree, the applicant's revolving credit product needs and values can be determined.

In addition, the questions presented to each applicant along with the applicant's responses are stored in the Applicant Experience and Attribute Tracking Database AEAT 150 at step 350. The applicant's characteristics provided by the AEAT 150 are maintained by the issuer.

If the applicant is a current customer who is interested in acquiring a new or alternative revolving credit product, the front-end question at step 210 will also pass information relating to the customer's needs to module IIM 105. At step 310, IIM 105 utilizes this information to present an initial question to the applicant.

If a current customer is interested in modifying the attributes for an existing revolving credit product, the system bypasses this module altogether, proceeding directly to the Applicant Characterization Module ACM 110, described below.

Figure 4:
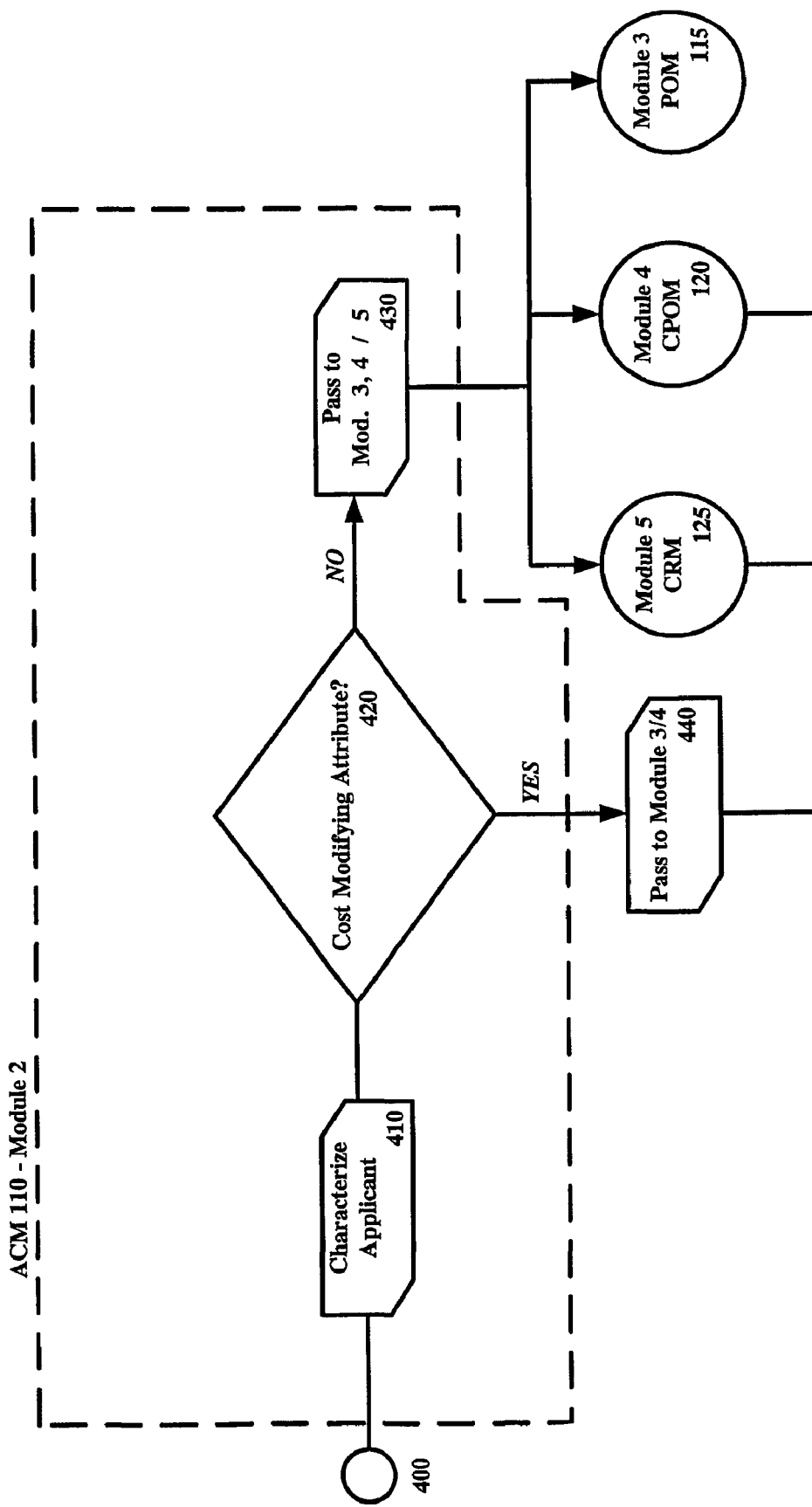
FIG. 4 depicts a flowchart of the steps comprising the Applicant Characterization Module according to one embodiment of the present invention.

FIG. 4 is a flow chart depicting the steps taken by the Applicant Characterization Module ACM 110 (Module 2) to characterize the applicant according to one embodiment of the present invention. This module characterizes and profiles the applicant based on external data and responses to questions presented in IIM 105.

At step 410, ACM 110 assigns each applicant to a characterization pool. In one embodiment of the invention, the applicant characterization reflects the values, credit risk, potential profitability, and current behavior of each applicant (if the applicant is a current customer). These assignments are based on applicant responses and external data extracted from the Applicant Experience and Attribute Tracking Database AEAT 150 as described earlier. These characterization pools are fundamental to the offers to be made to each applicant.

Once each applicant has been assigned to a characterization pool, ACM 110 determines, at step 420, whether the customer is modifying a revolving credit product attribute, or is seeking a new revolving credit product. If the response to this query is in the negative, the characterization pool is then passed on to the Product Offering Module POM 115, the Complimentary Product Offer Module CPOM 120, and the Offer Refinement Module ORM 125 as shown in step 430. If, on the other hand, the response to the query is in the affirmative, the characterization pool is passed on to the Product Offering Module POM 115 and the Complimentary Product Offer Module CPOM 120 as shown in step 440. These subsequent modules present the product offers, complementary products, and attribute trade-offs.

Figure 5:
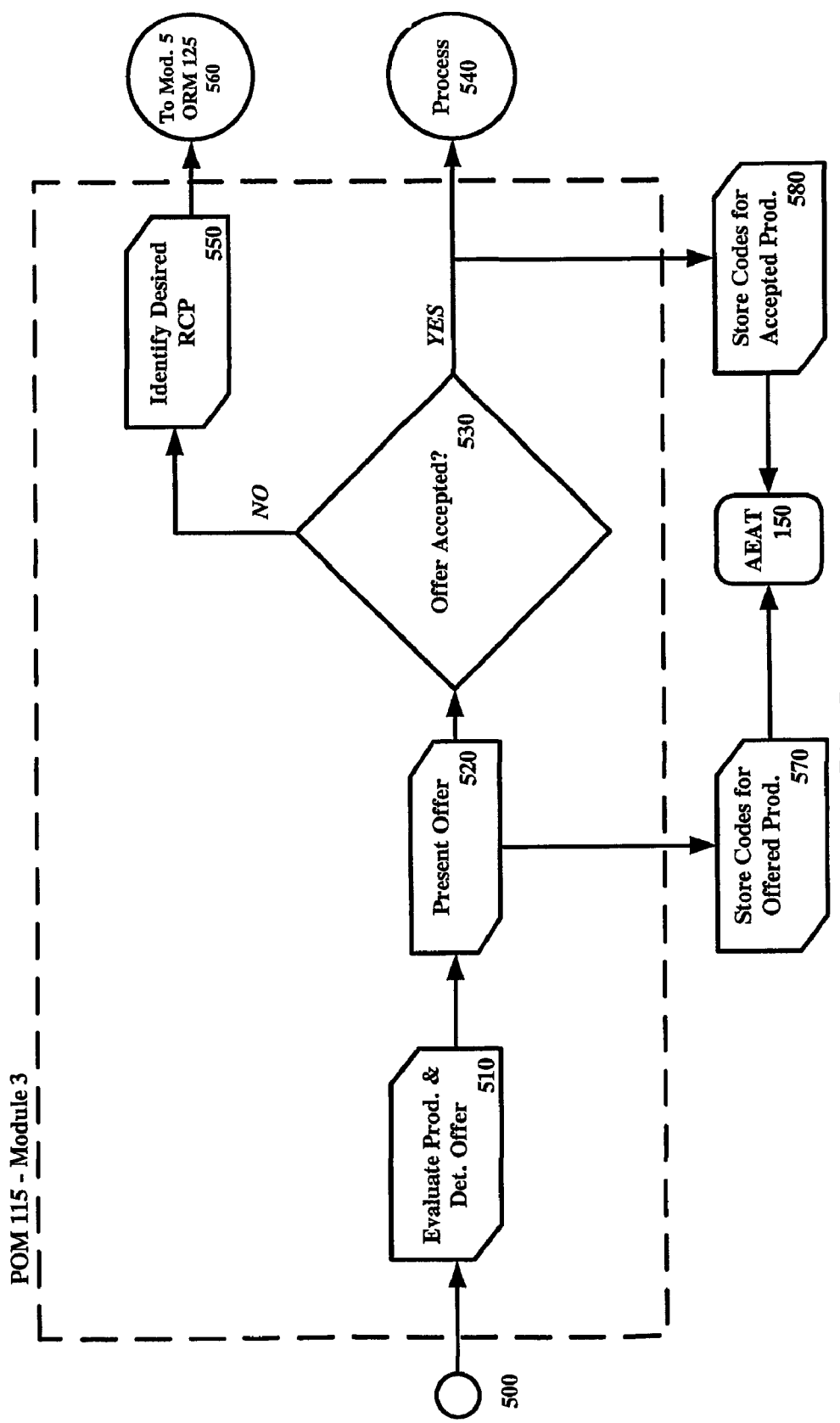
FIG. 5 depicts a flowchart of the steps comprising the Product Offers Module according to one embodiment of the present invention.

FIG. 5 is a flow chart depicting the steps taken by the Products Offers Module POM 115 (Module 3) to evaluate the products available, and identify the most appropriate product offers for each applicant, according to one embodiment of the present invention. All products are evaluated and prioritized in relation to the applicant's characteristics and issuer's objectives. Based on this evaluation, the top offers are presented to the applicant in terms consistent with the application system.

The applicant characterization pool information from ACM 110 is passed to POM 115 at step 500. In one embodiment of the invention, this information reflects the applicant's needs and values, credit risk, potential profitability, and current behavior as described earlier.

At step 510, the products available are evaluated, i.e., ranked, by POM 115 for "appropriateness" with respect to an applicant. This permits ready identification of the most appropriate (i.e., highest ranking) offers for an applicant. In one embodiment of the invention, the POM 115 receives product codes for the products to offer from the product codes 116, and matches these products codes to the issuer's objectives in objective table 117 to determine a set of potential product codes to offer the applicant. POM 115 then identifies the most appropriate product offers for each applicant based on each individual applicant's characteristics (characterization pool), as identified by the Applicant Characterization Module ACM 110, and the issuer's objectives, derived from objectives table 117.

Based on the ranking made in step 510, the top offers for an applicant are identified. The top offers are then presented to the applicant at step 520. Preferably, to enhance an applicant's sales experience, the top product offers are first matched with specific descriptions and graphic presentation material from the product presentation table 122, and those graphics and text are used to present the offer. This matching may be completed prior to the product offer being made to the applicant, as, for example, in step 510, but is preferably performed in combination with the presentation of the offer to the applicant in step 520.

Thus, module POM 115 enables the revolving credit product issuers to offer each applicant a relevant and unique experience. The issuers also receive the list of the product codes for the product offers made to each applicant.

If an applicant accepts an offer at step 530, POM 115 exits at step 540 so that the offer may be processed. If, on the other hand, an applicant declines an offer at step 530, the applicant is asked which revolving credit product (or attribute) is closest to their desired revolving credit product, and which attributes needs to be improved at step 550. The applicant is then transferred to the Offer Refinement Module ORM 125 at step 560. Module POM 115 also stores the codes for all products offered and for all product offers accepted in the Applicant Experience and Attribute Tracking Database AEAT 150 at steps 570 and 580 respectively.

Figure 6:
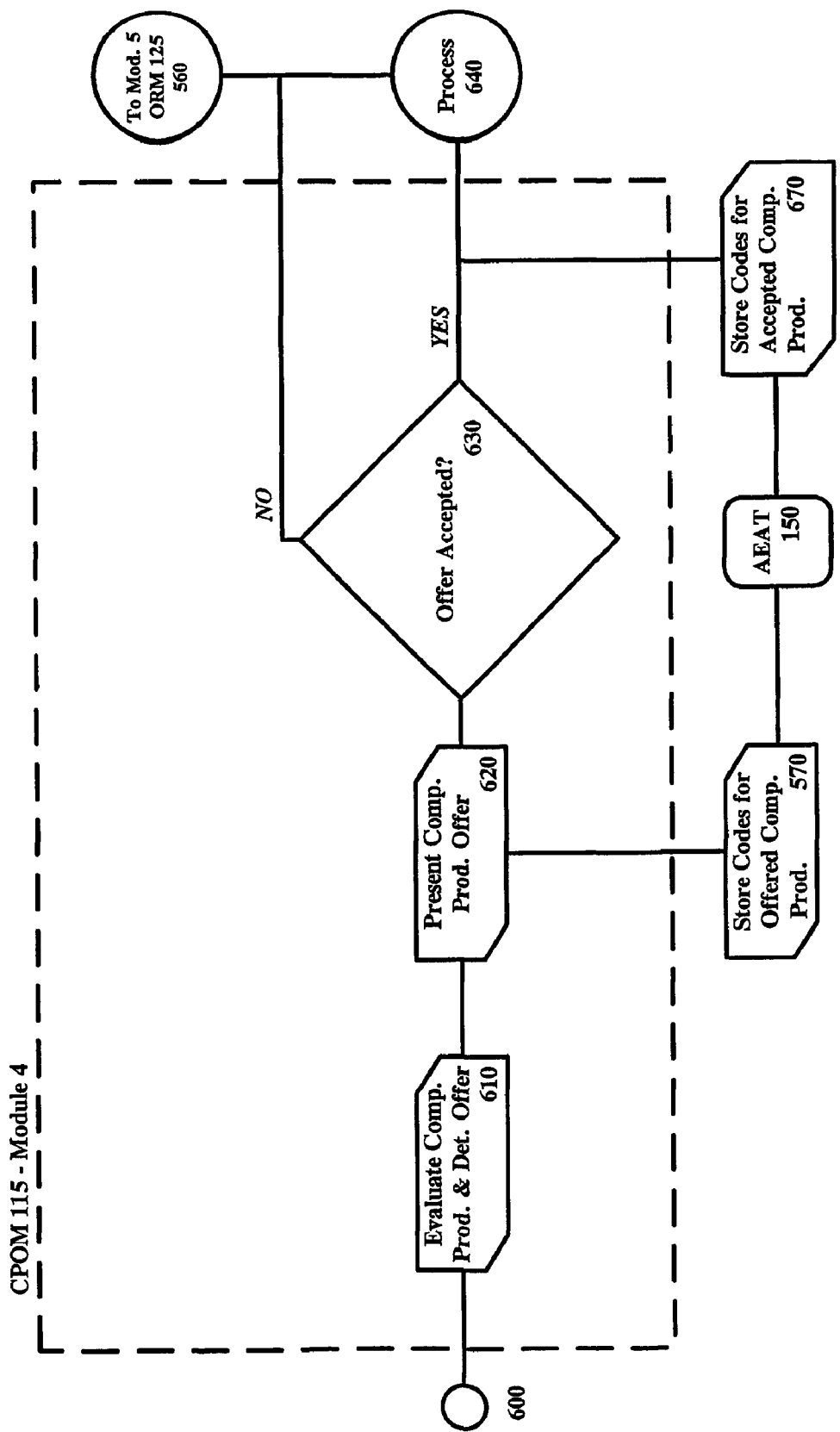
FIG. 6 depicts a flowchart of the steps comprising the Complementary Product Offers Module according to one embodiment of the present invention.

FIG. 6 is a flow chart depicting the steps taken by the Complementary Product Offers Module CPOM 120 (Module 4) to evaluate the complementary products available, and identify the most appropriate complementary product offers for each applicant, according to one embodiment of the present invention. Complementary products are evaluated and prioritized in relation to the applicant's characteristics and issuer's objectives. Based on this evaluation, the top complimentary product offers are presented to the applicant in terms consistent with complementary product systems.

The applicant characterization pool information from ACM 110 is passed to CPOM 120 at step 600. In one embodiment of the invention, this information reflects the applicant's needs and values, credit risk, potential profitability, and current behavior.

At step 610, the complimentary products available are evaluated, i.e. ranked, by CPOM 120 for "appropriateness" with respect to the applicant. This permits ready identification of the most appropriate (i.e. highest ranking) complimentary offer for an applicant. In one embodiment of the invention, the CPOM 120 receives complimentary product codes for the complimentary product offers from vendor complimentary products table 121. These complimentary product codes are then matches to the issuer's objectives in objective table 117 to determine a set of potential complimentary product codes to offer the applicant. CPOM 120 then identifies the most appropriate complimentary product offers for each applicant based on each individual applicant's characteristics (characterization pool), as identified by ACM 110, and the issuer's objectives derived from objectives table 117.

Based on the ranking made in step 610, the top complimentary offers are identified. The offers are then presented to the applicant at step 620. Preferably, to enhance the applicant's sales experience, the top complimentary product offers are first matched with specific descriptions and graphic presentation material from the complementary product presentation table 122, and those graphic and text are used to present the offer. This matching may be completed in step 610 prior to the complementary offer being presented to the applicant, as for example, in step 610, but is preferably performed in combination with presentation of the offer to the applicant in step 620.

The complementary product offers are then presented to the applicant by CPOM 120 at step 620. If an applicant accepts an offer at step 630, module CPOM 120 exits at step 640 so that the complementary product offer may be processed. If, on the other hand, the applicant declines the offer at step 630, the module CPOM 120 may take several different paths. In one embodiment of the invention, the module CPOM 120 may exit at step 640. Alternatively, in another embodiment of the invention, the applicant can be transferred to the Offer Refinement Module ORM 125 at step 650 so that an offer more closely aligned with the applicant's needs can be identified.

Module CPOM 120 also stores the codes for all complementary products offered (in step 620), and for all complementary product offers accepted (in step 630), in database AEAT 150 at steps 660 and 670 respectively.

Figure 7:
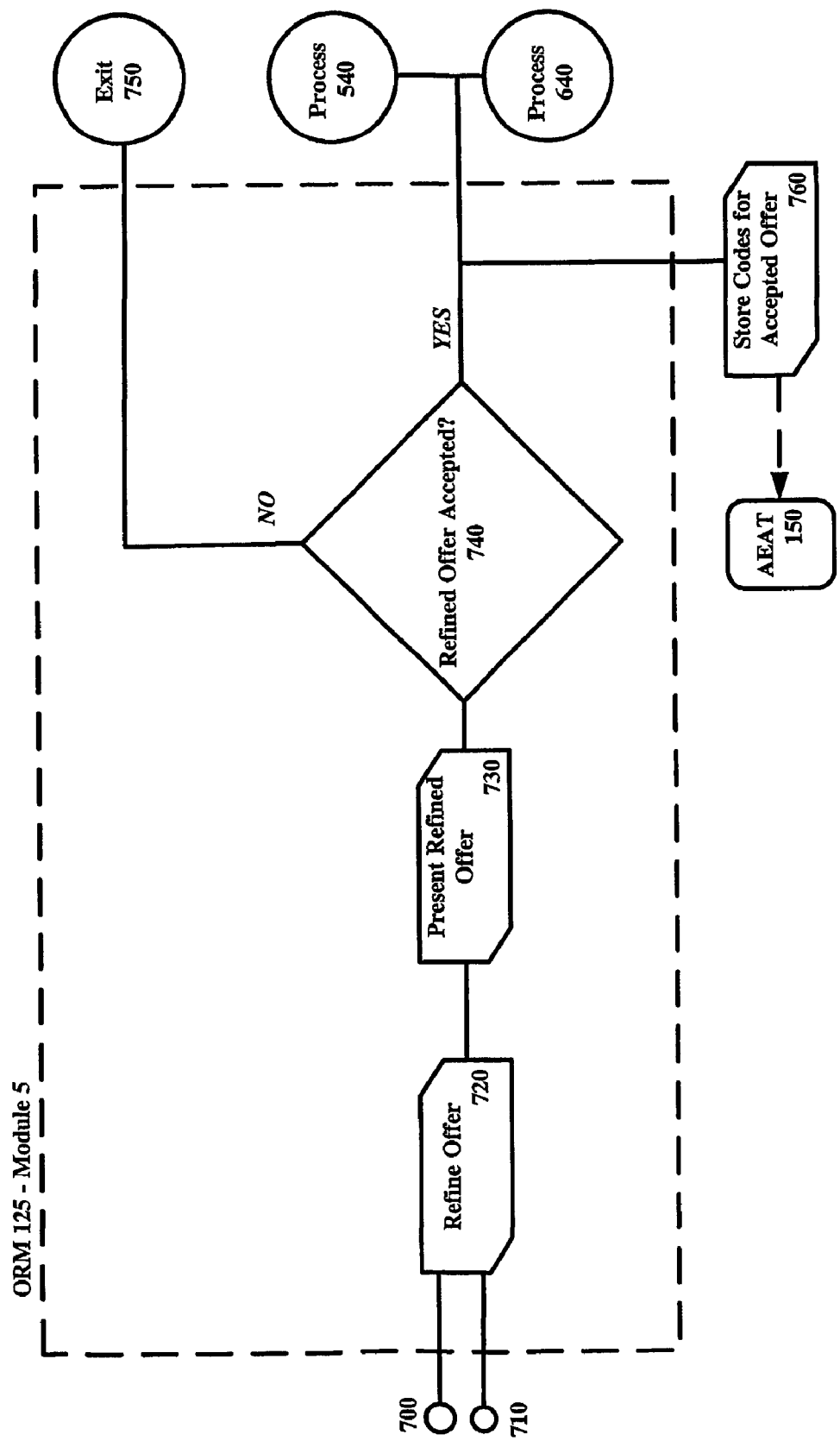
FIG. 7 depicts a flowchart of the steps comprising the Offer Refinement Module according to one embodiment of the present invention.

FIG. 7 is a flow chart depicting the steps taken by the Offer Refinement Module ORM 125 (Module 5) to refine offers made to existing and prospective customers according to one embodiment of the present invention. This module performs two functions. First, for existing revolving credit product customers who identified in module IIM 105 that they are seeking a modification to their revolving credit product, module ORM 125 identifies alternative refinements that are acceptable to the issuer and that more closely align with the customer's needs. Second, for those applicants who are seeking a new revolving credit product, and who have rejected the offers presented in module POM 115 or CPOM 120, module ORM 125 allows the applicant to make several product counter-offers that are equally acceptable to the issuer and that more closely align with the customer's needs.

In either scenario, module ORM 125 determines a set of feasible refinement offers to enable the issuer to offer each applicant another opportunity to find a product that meets his or her needs. This refinement offer is determined in step 720.

In one embodiment of the invention, the issuer receives the list of product or complimentary product codes reflecting the refinement offers to be made from module POM 115 and CPOM 120, steps 700 and 710 respectively. These codes may represent products in the products table 116 and/or vendor complimentary product codes table 121 that were not initially offered to the applicant. In another embodiment of the invention, these codes may represent products in the products table 116 and/or vendor complimentary product codes table 121 that the applicant has identified (from among the rejected offer list) as being closest to an offer they would likely accept. Applicants are then asked which product and/or complimentary product attribute would need to be modified for them to accept the offer.

In one embodiment of the invention, the product codes are matched to the issuer's objectives in objective table 117 to determine a set of potential product codes to offer the applicant. ORM 125 then identifies the most appropriate product offers for each applicant based on each individual applicant's characteristics (characterization pool), as identified by ACM 110, and the issuer's objectives derived from objectives table 117.

Based on this evaluation, the top refined product offers are complete and ready for presentation to the applicant as shown in step 720. Preferably, to enhance the applicant's sales experience, the refinement product codes are matched to specific descriptions and graphic presentation material and presented to the applicant at step 730, so that the applicant can interact with the issuer's trade-off selections.

A determination is made in step 740 as to the applicant's acquiescence in the refined offer. If the refined offer is accepted by the applicant, the applicant is transferred to step 540 (for product codes) or 640 (for complimentary product codes) so that the offer can be processed. If the refined offer is declined by the applicant, the module exits at step 750. In this case, no sale is made. In addition, the product codes for the accepted offer are stored in the Applicant Experience and Attribute Tracking Database 150 as shown in step 760.

Figure 8:
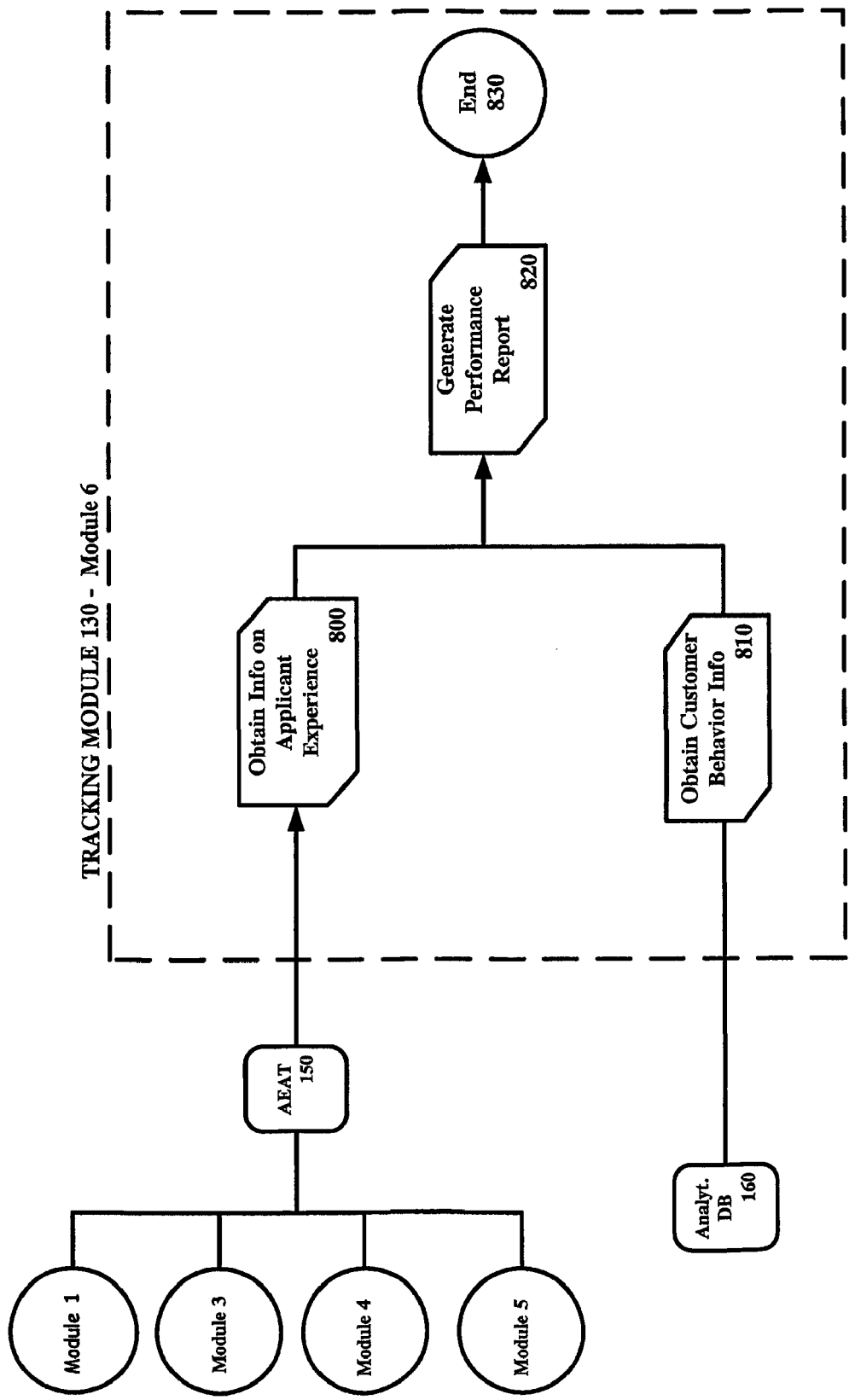
FIG. 8 depicts a flowchart of the steps comprising the Performance Tracking Module according to one embodiment of the present invention.

FIG. 8 is a flow chart depicting the steps taken by the Performance Tracking Module 130 (Module 6) to create a set of management reports according to one embodiment of the invention. In one embodiment of the invention, management report templates detail the applicant behavior, account profitability and sales performance, and loads them into a reporting engine.

The report engine is operatively connected to Tracking Module 130. The reports are designed to summarize data included in the applicant experience and attribute tracking database AEAT 150 and the issuer's analytic database 160. The report engine enables fast production and distribution of performance measures in a consistent and reliable manner with a limited need for ad hoc reporting.

In order to generate these reports, the report engine obtains information regarding the applicants' experience as shown in step 800. In one embodiment of the invention, this data is obtained from the Applicant Experience and Attribute Tracking Database AEAT 150, and includes information regarding questions presented to each applicant and their responses, and product codes for all products, including complementary products, that were offered to applicants, and all product codes for those offers that were adapted by applicants. This information may be supplied to AEAT 150 by IIM 105, POM 115, CPOM 120 and ORM 125 as described earlier.

Similarly, the report engine also utilizes customer behavior information gathered in step 810 when generating the reports. In one embodiment of the invention, this information is obtained from the issuer's Analytic Database 160.

Tracking Module 130 reports results in a consistent and reliable manner. A set of report templates are designed and programmed to summarize customer behavior, account profitability, sales performance, etc. The report templates detailing the applicant's behavior, profitability and sales performance are created and loaded into a report engine, and a report is generated, as shown in step 820 once the report is prepared, the module exits as shown in step 830. The report engine facilitates mass production and distribution of these reports in a consistent manner.

Figure 9:
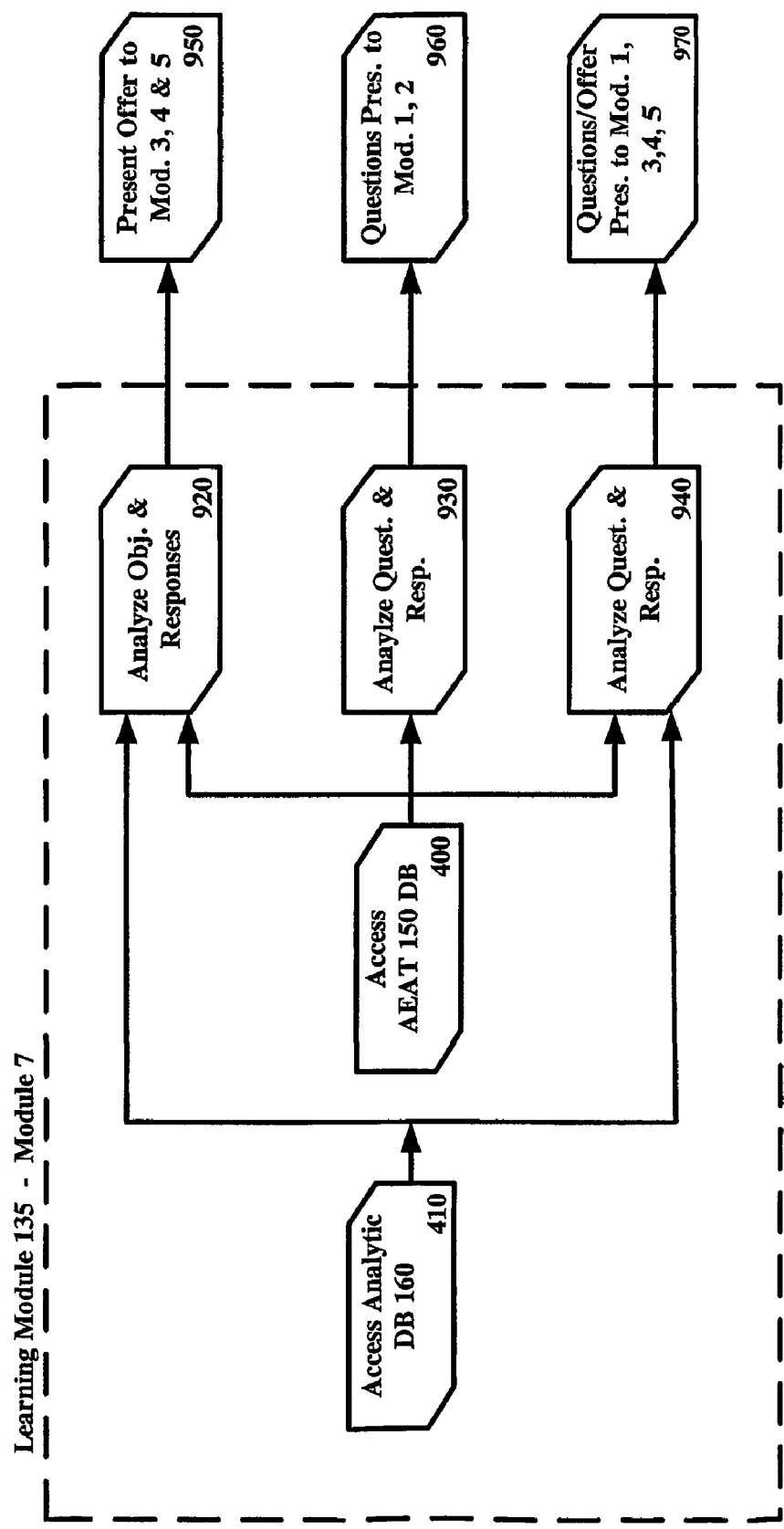
FIG. 9 depicts a flowchart of the steps comprising the Learning Module according to one embodiment of the present invention.

FIG. 9 is a flow chart depicting the steps taken by the Learning Module 135 (Module 7) to leverages the experience of applicants and customers according to one embodiment of the present invention.

Learning Module 135 leverages the experience of applicants and customers as characterized by the Applicant Experience and Attribute Tracking Database AEAT 150 and the issuer's Analytic Database 160, to learn in three distinct domains. First, Learning Module 135 learns how to align offers and counter offers to applicants and customers. Second, Learning Module 135 learns how to aggregate applicants in more homogeneous and relevant groups or pools to anticipate performance. Finally, Learning Module 135 learns how to assess credit risk among thin-file applicants.

The Learning Module 135 accesses the Applicant Experience and Attribute Tracking Database AEAT 150 and the issuer's Analytic Database 160 to support ongoing learning and analysis. The module then evaluates applicants' responses and the behavior associated with accepted and rejected offers to understand how to align products to meet the issuer's objectives. The evaluation of offers in this format is similar to a hybrid conjoint analysis. Applicant Experience and Attribute Tracking Database AEAT 150 is particularly rich in its ability to support this goal in so far as applicants are presented with several offers through Modules POM 115, CPOM 120 and ORM 125. Thus, the Learning Module enables the invention to improve the targeting of offers to applicants through the refinement of the pools as well as the targeting of offers to pools.

In one embodiment of the invention, the module is implemented as a computer program that reads the Applicant Experience and Attribute Tracking Database AEAT 150 and the issuer's Analytic Database 160 as shown in steps 900 and 910 respectively. These data are used to enhance the alignment of offers to applicants and credit risk evaluation among thin-file applicants. Learning is reintegrated into Modules IIM 105, ACM 110, POM 115, CPOM 120 and ORM 125.

In order to determine better aligned offers to meet the objectives for each pool, Learning Module 135, at step 920, analyzes issuer's objectives and applicants' responses and the behavior associated with accepted and rejected offers. The responses are taken from responses to Modules IIM 105, POM 115, CPOM 120 and ORM 125, as stored in the Applicant Experience and Attribute Tracking Database AEAT 150. Customer behavior information is obtained from the issuer's Analytic Database 160. The improved offers are presented to Modules POM 115, CPOM 120 and ORM 125 at step 950.

In order to improve the questions presented to applicants, as well as to improve the applicant characterization pools, the Learning Module 135, at step 930, analyzes questions presented and applicants' responses. The questions and responses are those saved by Module IIM 105 in the Applicant Experience and Attribute Tracking Database AEAT 150. The improved questions and characterization pools are presented to Modules IIM 105 and ACM 110 at step 960.

For thin-file applicants and non-traditional credit seekers, the Learning Module 135 analyses questions and responses from Module IIM 105 along with associated customer behavior at step 940, so that the system can develop an alternative battery of questions and risk evaluations associated with alternative responses. The module utilizes responses from questions presented in Module IIM 105 saved in the Applicant Experience and Attribute Tracking Database AEAT 150, and customer behavior information extracted from the Analytic Database 160. These improved questions and offers are presented to Modules IIM 105, POM 115, CPOM 120 and ORM 125 at step 970.

The present invention is in no way limited to the embodiment described above. It will be immediately apparent to those skilled in the art that variations and modifications to the disclosed embodiment are possible without departing from the spirit and scope of the present invention. The invention is defined by the appended claims.

What is claimed is:

1. Method of making an offer for revolving credit products to an applicant, the method comprising the steps of:
   a. Storing an identifier for each of a plurality of revolving credit products;
   b. Associating at least one attribute with each of the revolving credit products;
   c. Receiving an application from an individual applicant;
   d. Profiling the application to provide an applicant profile, wherein the applicant profile includes data relating to the individual applicant's needs, data relating to anticipated behavior of the individual applicant, and data relating to characteristics of the individual applicant;
   e. providing a module that allows an issuer to identify an objective of the offer, said objective being an objective selected from the group: account growth, asset growth, risk, profit, account generation, asset generation, credit loss, and profit generation;
   f. Creating a set of revolving credit products, the set comprising a plurality of revolving credit products that fit within the applicant profile, whereby each of the set of the plurality of revolving credit products relate to the applicant's needs, anticipated behavior, and characteristics;
   g. Ranking the set of revolving credit products based upon the objective of the offer and the at least one attribute of each revolving credit product in the set;

h. Creating a set of top ranking revolving credit products based on the ranking, the set of top ranking revolving credit products being smaller than the set of revolving credit products; and i. Offering to the applicant at least one revolving credit product from the set of the top ranking revolving credit products, wherein said storing, associating, receiving, profiling, selecting, creating, ranking, and offering steps are performed on at least one particular machine, said at least one particular machine comprising at least one physical computing device.

2. The method of claim 1 where the step of profiling the application comprises obtaining a set of objective indicia describing the application based on the application received from the applicant.

3. The method of claim 2 wherein the set of objective indicia describing the application comprises assessing the applicant's risk, value, and behavior.

4. The method of claim 3 wherein assessing the applicant's risk comprises the step of obtaining a numerical value.

5. The method of claim 3 wherein assessing the applicant's risk comprises the step of obtaining a FICO number.

6. The method of claim 3 wherein assessing the value comprises the steps of:
   a. obtaining information from an applicant;
   b. evaluating the information obtained from the applicant based on historical data of similar applicants; and
   c. assigning a value assessment tag to the applicant based on the information obtained.

7. The method of claim 3 wherein assessing the value comprises the step of categorizing an applicant based upon the applicant's known characteristics.

8. The method of claim 3 wherein assessing the applicant's behavior comprises the steps of:
   a. obtaining information from an applicant;
   b. evaluating the information obtained from the applicant based on historical data of similar applicants; and
   c. assigning a value to the applicant's behavior based on the information obtained.

9. The method of claim 3 wherein the assessment of behavior comprises the steps of:
   a. evaluating one or more behavior patters of an applicant; and
   b. determining one or more numerical values describing the applicant's behavior patterns.

10. The method of claim 3 wherein profiling the application comprises the step of obtaining a credit profile for the applicant.

11. The method of claim 1, wherein identifying an objective of the offer comprises performing a relative valuation between a plurality of sub-objectives.

12. The method of claim 11 wherein performing a relative valuation between sub-objectives comprises valuating risk and profit.

13. The method of claim 11 wherein performing a relative valuation between sub-objectives comprises valuating risk, profit, size and accounts.

14. The method of claim 1 wherein the step of receiving an application from an applicant comprises the steps of:
   a. generating a first set of questions, the questions relating to the demographics of the applicant;
   b. presenting the applicant with the first set of questions, and determining demographic information on the basis of a first set of responses thereto;
   c. generating a second set of questions, the second set of questions relating to product desires of the applicant; and
   d. presenting the applicant with the second set of questions, and receiving a second set of responses thereto.

15. The method of claim 14 wherein the step of generating a second set of questions comprises taking prior questions and responses and identifying the next question to present to the applicant based on the prior question.

16. The method of claim 1 wherein the step of creating a set of revolving credit products comprises evaluating the attributes of the revolving credit products in relation to the objectives of the offer.

17. The method of claim 1 wherein the step of ranking the set of revolving credit products comprises evaluating the set of revolving credit products based upon at least the objectives of the offer and the attributes of the revolving credit products.

18. The method of claim 1 further comprising the step of refining the offer to the applicant if the applicant rejects at least one of the top ranking revolving credit products from the set of revolving credit products, wherein said refining step is performed on at least one particular machine, said at least one particular machine comprising at least one physical computing device.

19. The method of claim 18 wherein the step of refining the offer to the applicant comprises the steps of:
   a. determining attributes of the revolving credit product that more closely aligns with the applicant's needs;
   b. creating a refined set of revolving credit products, the refined set of credit products being based upon a plurality of revolving credit products that more closely align with the applicant's needs;
   c. ranking the set of refined revolving credit products based upon the objectives of the offer and the attributes of the revolving credit products that more closely align with the applicant's needs; and
   d. offering at lease one of the top ranking refined revolving credit products from the set of refined revolving credit products to the applicant.

20. A computer-readable storage medium having computer-executable instructions for a method for making an offer for revolving credit products to an applicant, the method comprising the steps of:
   a. Storing an identifier for each of a plurality of revolving credit products;
   b. Associating at least one attribute with each of the revolving credit products;
   c. Receiving an application from an individual applicant;
   d. Profiling the application to provide an applicant profile, wherein the applicant profile includes data relating to the applicant's needs, data relating to anticipated behavior of the applicant, and data relating to characteristics of the applicant;
   e. providing a module that allows an issuer an issuer to identify an objective of the offer, said objective being an objective selected from the group: account growth, asset growth, risk, profit, account generation, asset generation, credit loss, and profit generation;
   f. Creating a set of revolving credit products, the set comprising a plurality of revolving credit products that fit within the applicant profile, whereby each of the set of the plurality of revolving credit products relate to the applicant's needs, anticipated behavior, and characteristics;
   g. Ranking the set of revolving credit products based upon the objective of the offer and the at least one attribute of each revolving credit product in the set;

h. Creating a set of top ranking revolving credit products based on the ranking, the set of top ranking revolving credit products being smaller than the set of revolving credit products; and
i. Offering to the applicant at least one revolving credit product from the set of the top ranking revolving credit products, wherein said storing, associating, receiving, profiling, selecting, creating, ranking, and offering steps are performed on at least one particular machine, said at least one particular machine comprising at least one physical computing device.

* * * * *